(12) United States Patent
Winterowd et al.

(10) Patent No.: US 8,458,971 B2
(45) Date of Patent: Jun. 11, 2013

(54) FIRE RESISTANT WOOD PRODUCTS

(75) Inventors: Jack G. Winterowd, Puyallup, WA (US); Glen Robak, Meridian, ID (US)

(73) Assignee: Weyerhaeuser NR Company, Federal Way, WA (US)

( * ) Notice: Subject to any disclaimer, the term of this patent is extended or adjusted under 35 U.S.C. 154(b) by 113 days.

(21) Appl. No.: 13/172,419

(22) Filed: Jun. 29, 2011

(65) Prior Publication Data

US 2013/0000239 A1  Jan. 3, 2013

(51) Int. Cl.
*C08K 5/34* (2006.01)

(52) U.S. Cl.
USPC .............................................. 52/232; 524/101

(58) Field of Classification Search
USPC ................. 52/232; 524/101, 411, 423, 425, 524/434, 495, 399, 443, 464; 428/423.1
See application file for complete search history.

(56) References Cited

U.S. PATENT DOCUMENTS

| | | | |
|---|---|---|---|
| 4,292,214 A | 9/1981 | Blount | |
| 5,200,267 A | 4/1993 | Bauer et al. | |
| 5,739,173 A | 4/1998 | Lutter et al. | |
| 5,880,243 A | 3/1999 | Park et al. | |
| 5,968,669 A | 10/1999 | Liu et al. | |
| 6,084,008 A | 7/2000 | Liu | |
| 6,225,404 B1 | 5/2001 | Sorensen et al. | |
| 6,228,914 B1 | 5/2001 | Ford et al. | |
| 6,245,842 B1 | 6/2001 | Buxton et al. | |
| 6,886,306 B2 | 5/2005 | Churchill et al. | |
| 7,354,503 B2 | 4/2008 | Hume | |
| 2005/0258561 A1 | 11/2005 | Churchill et al. | |
| 2006/0174798 A1 | 8/2006 | Churchill | |
| 2009/0036561 A1 | 2/2009 | Nygren | |
| 2009/0309077 A1 | 12/2009 | Gupta et al. | |
| 2010/0076098 A1 | 3/2010 | Mabey et al. | |
| 2011/0241248 A1* | 10/2011 | Merkel et al. | ................. 264/255 |
| 2012/0142240 A1* | 6/2012 | Eling et al. | ....................... 442/59 |

FOREIGN PATENT DOCUMENTS

WO   9111498 A1   8/1991

* cited by examiner

*Primary Examiner* — Mark Wendell
(74) *Attorney, Agent, or Firm* — Christensen O'Connor Johnson Kindness PLLC

(57) ABSTRACT

The present disclosure is directed generally towards fire-resistant wood products and formulations for fire-resistant coatings. In some embodiments, the disclosure includes a fire-resistant coating comprising an aromatic isocyanate (present in a quantity ranging from about 15% to about 39%), castor oil (present in a quantity ranging from about 37% to about 65%), and intumescent particles (present in a quantity ranging from about 1% to about 40%). Further aspects are directed towards materials such as wood products coated with fire-resistant coatings according to embodiments of the disclosure.

21 Claims, 5 Drawing Sheets

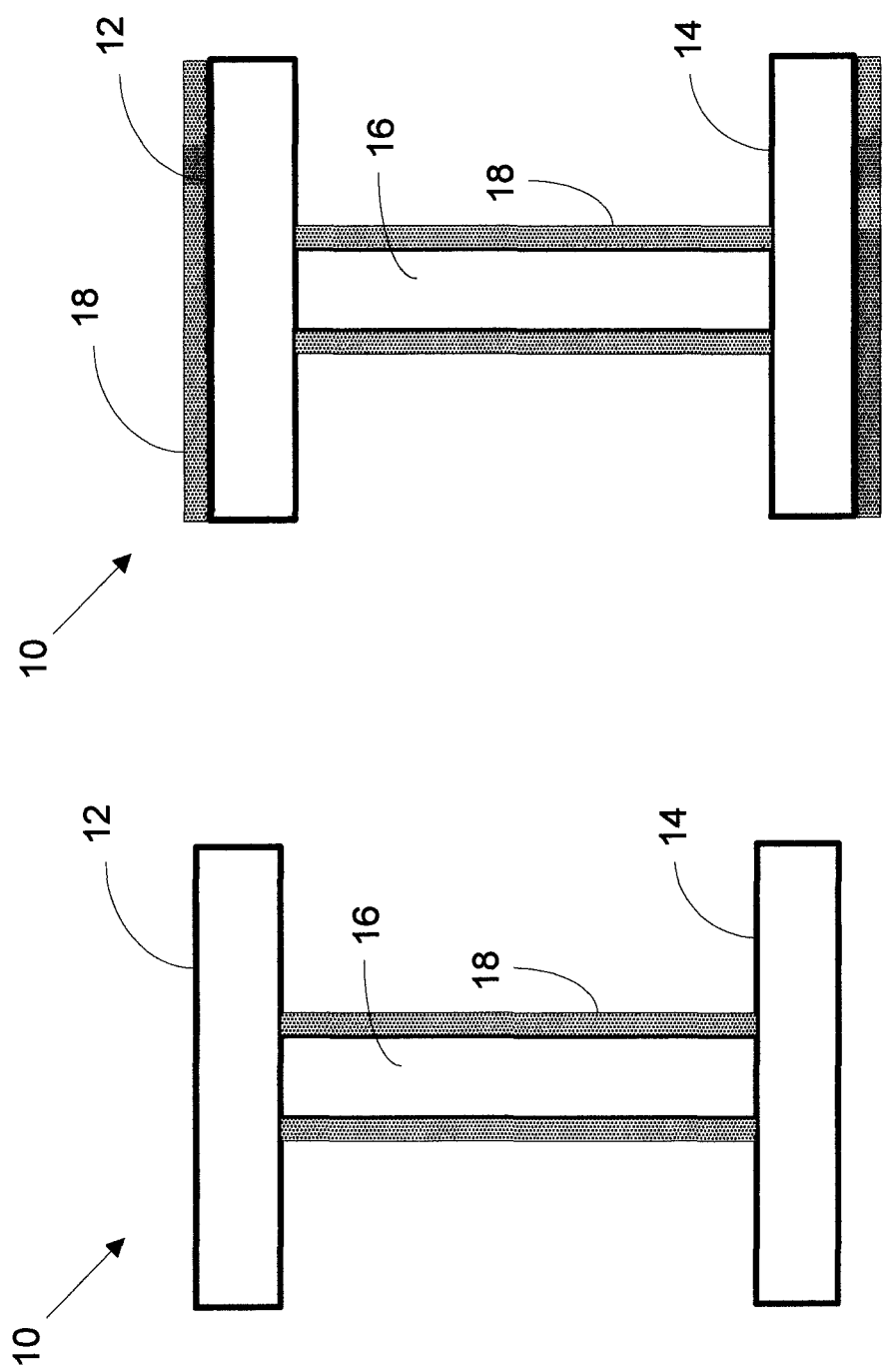

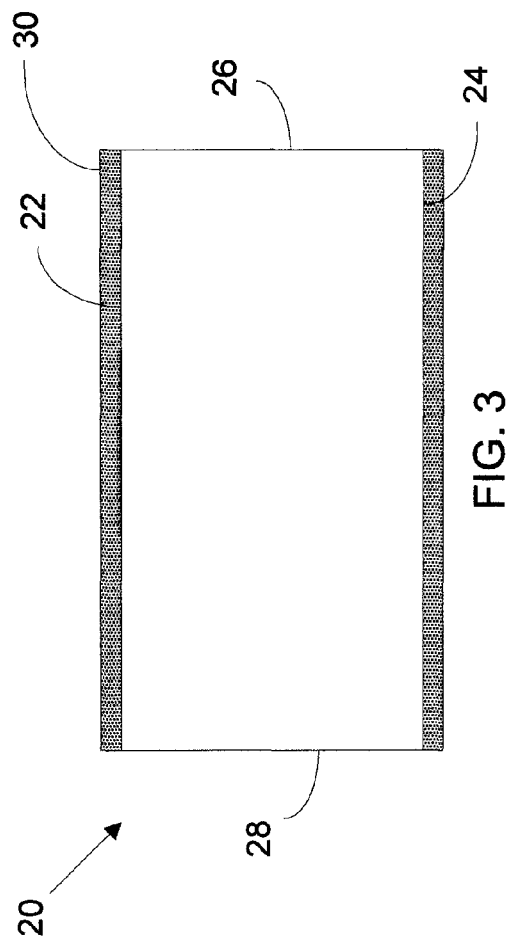
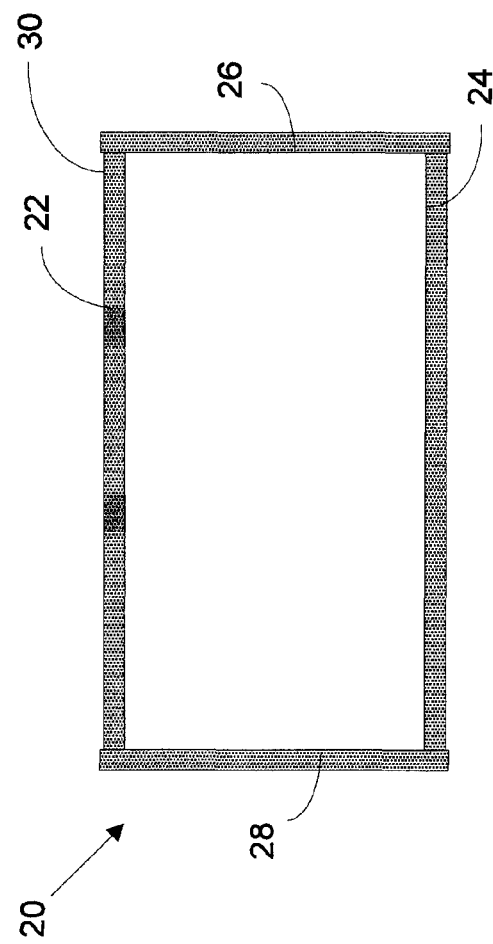

FIRE RESISTANT WOOD PRODUCTS

TECHNICAL FIELD

The present disclosure is directed generally to fire-resistant wood products and formulations for fire-resistant coatings.

BACKGROUND

Fire-safe construction and safety are major concerns for the building materials and construction industry. The 2006 U.S. Fire Administration statistics on residential and commercial fires in the U.S. alone include 3,245 fire fatalities and an estimated $11.3 billion in property damage. These numbers underscore the seriousness of the issue and the need for fire-safe construction.

One way to improve the fire-safety of buildings is to follow construction guidelines for fire prevention and damage mitigation, which include detailed recommendations regarding structural design, assemblies, sprinkler systems, smoke detectors, and other factors influencing how a fire might start and spread throughout a building. In addition, companies that manufacture building materials from wood have taken steps to make their products inherently more fire-safe. Some companies have experimented with coating or impregnating wood products with fire-retardant chemical treatments. One example of such a treatment is described in U.S. Pat. No. 6,245,842, the disclosure of which is hereby incorporated by reference. Another illustrative example can be found in U.S. Pat. No. 5,968,669.

Although conventional fire-resistant coatings can help improve fire-performance, they are not without shortcomings. Many commercially available treatments protect wood from flame spread and/or direct combustion; however, they do not provide much improvement in extending the time a wood element can sustain a structural load in a fire event. In a building application, premature failure can occur in some load carrying wood products subjected to a fire event. Extending the duration these products can sustain structural loads in a fire event would provide additional time for the occupants to vacate the building. In addition, some of the conventional treatments applied do not provide the required durability for the wood product. For example, during the construction process, water durability can be particularly advantageous. Finally, many treatments that can achieve the desired results are very expensive and cost prohibitive to manufacture on a large scale.

Thus, there is a need in the industry to develop improved coatings for wood products that provide fire-resistant properties. Specifically, there is a need to develop fire-resistant coatings for wood products that remain effective when exposed to prolonged exposure to water and extend the time these products can sustain a structural load during a fire event thus providing for improved occupant safety. In addition, a durable fire-resistant coating that slows flame spread would also be useful.

SUMMARY

The following summary is provided for the benefit of the reader only and is not intended to limit in any way the invention as set forth by the claims. The present disclosure is directed generally towards fire-resistant wood products and formulations for fire-resistant coatings.

In some embodiments, the disclosure includes a fire-resistant coating comprising an aromatic isocyanate, castor oil, and intumescent particles. The aromatic isocyanate may be present in a quantity ranging from about 15% to about 39% by weight of the coating. The castor oil may be present in a quantity ranging from about 37% to about 65% by weight of the coating. The intumescent particles may be present in a quantity ranging from about 1% to about 40% by weight of the coating. Further aspects are directed towards materials such as wood products coated in fire-resistant coatings according to embodiments of the disclosure.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIGS. 1 and 2 are side cross sectional views of Hoists coated with fire-resistant coatings according to embodiments of the disclosure;

FIGS. 3 and 4 are side cross sectional views of wood products coated with fire-resistant coatings according to embodiments of the disclosure

DETAILED DESCRIPTION

Figure 5:
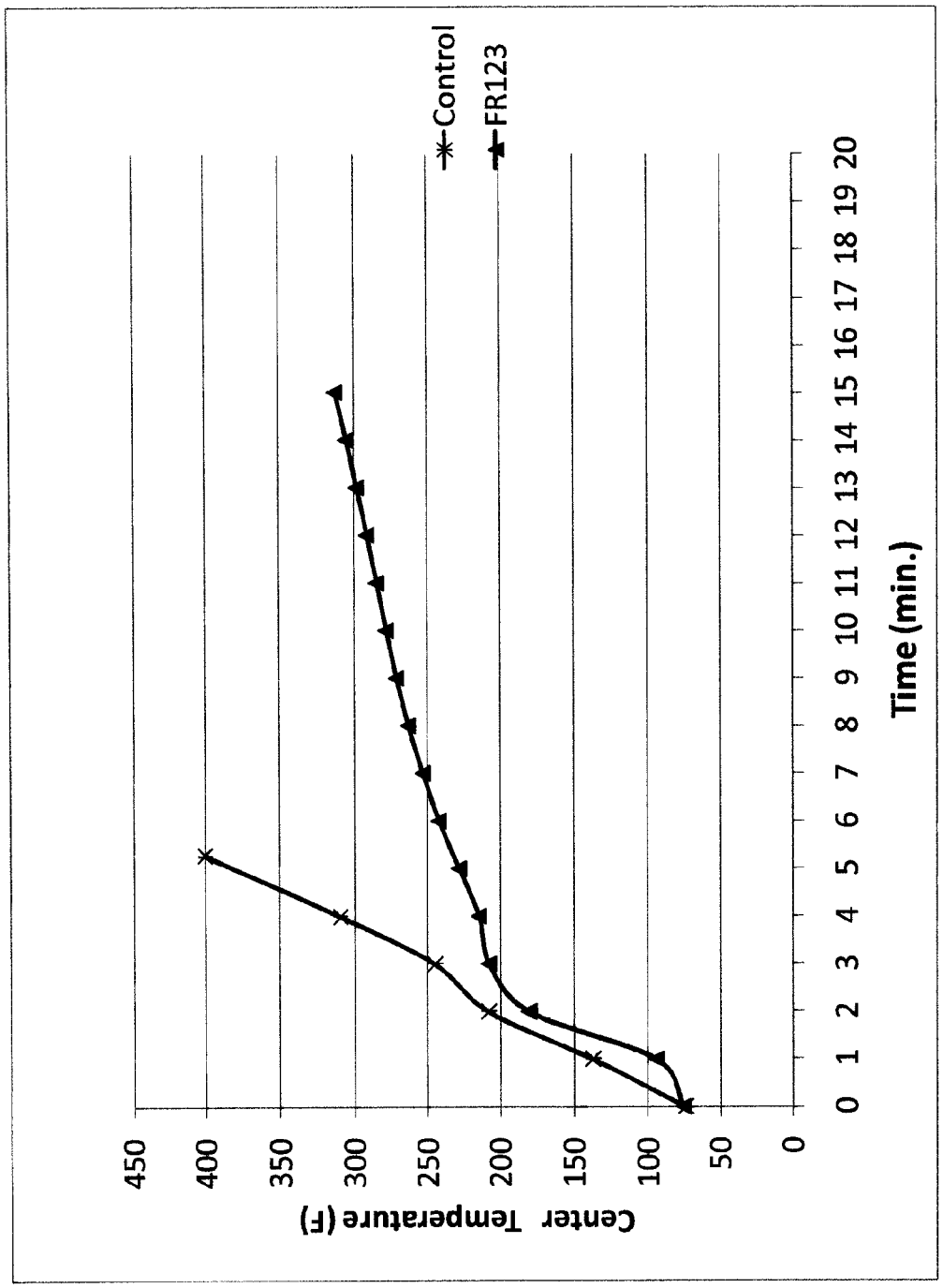
FIG. 5 is a graph of temperature versus time for lab scale fire tests.

The present disclosure describes fire-resistant wood products and formulations for fire-resistant coatings. Certain specific details are set forth in the following description and FIGS. 1-7 to provide a thorough understanding of various embodiments of the disclosure. Well-known structures, systems, and methods often associated with such systems have not been shown or described in detail to avoid unnecessarily obscuring the description of various embodiments of the disclosure. In addition, those of ordinary skill in the relevant art will understand that additional embodiments of the disclosure may be practiced without several of the details described below. Certain terminology used in the disclosure are defined as follows:

"Wood product" is used to refer to a product manufactured from logs such as lumber (e.g., boards, dimension lumber, solid sawn lumber, joists, headers, trusses, beams, timbers, mouldings, laminated, finger jointed, or semi-finished lumber), composite wood products, or components of any of the aforementioned examples. The term "wood element" is used to refer to any type of wood product.

"Composite wood product" is used to refer to a range of derivative wood products which are manufactured by binding together the strands, particles, fibers, or veneers of wood, together with adhesives, to form composite materials. Examples of composite wood products include but are not limited to parallel strand lumber (PSL), oriented strand board (OSB), oriented strand lumber (OSL), laminated veneer lumber (LVL), laminated strand lumber (LSL), particleboard, medium density fiberboard (MDF) and hardboard.

"Intumescent particles" refer to materials that expand in volume and char when they are exposed to fire.

Overview

This disclosure relates to wood products coated with fire-resistant coatings. Fire-resistant components according to embodiments of the disclosure are water-free, solvent-free, reactive, liquid formulations having two main components:

(1) an intumescent component; and (2) a polyurethane matrix component. The intumescent component comprises intumescent particles present in a quantity ranging from about 1% to about 40% by weight of the total formulation. The polyurethane matrix component includes an aromatic isocyanate present in a quantity ranging from about 15% to about 39% by weight of the formulation and castor oil present in a quantity ranging from about 37% to about 65% by weight of the formulation. In a preferred embodiment, the castor oil is present in a quantity ranging from about 37% to about 56% by weight of the total formulation. Coatings according to embodiments of the disclosure can be applied to various types of wood products and will be described in further detail below.

One problem with known fire-resistant coatings containing intumescent particles is referred to as the "popcorn effect". Generally when heated to a critical temperature (often about 150° C. to 200° C.), intumescent particles may increase in volume by about 50 to 300 times their original size. The expansion event for an individual particle tends to occur over a period of less than a couple of seconds. If the intumescent particles are contained in a polymer matrix that does not have the ability to expand at the same rate as the intumescent particle, then the polymer matrix will tend to rupture and the expanding action of the intumescent particle may project it away from the substrate that it is intended to protect. Accordingly, the effectiveness of the coating and its ability to resist fire may be substantially decreased.

Properties associated with embodiments according to the disclosure may be achieved through use of a unique polyurethane composition in the formulation that is particularly rich in polyol component (castor oil). Polyurethanes of this sort do not melt, but do have high degrees of elasticity at room temperature as well as at elevated temperatures, especially in the temperature range of about 150° C. to 600° C. Polyurethane matrices according to embodiments of the disclosure have sufficient crosslink density to prevent them from melting at elevated temperature, but also has sufficient elasticity to allow them to deform rapidly in response to the expanding, embedded intumescent particles.

Polyurethane Matrix Component

As described above, the polyurethane matrix component includes an aromatic isocyanate component and a castor oil component. The aromatic isocyanate component may be present in a quantity ranging from about 15% to about 39% by weight of the formulation. The aromatic isocyanate may be a single aromatic isocyanate or mixtures of such compounds. Examples of the aromatic multifunctional isocyanates include toluene diisocyanate (TDI), monomeric methylene diphenyldiisocyanate (MDI), polymeric methylenediphenyldiisocyanate (pMDI), 1,5'-naphthalenediisocyante, and prepolymers of the TDI or pMDI, which are typically made by reaction of the pMDI or TDI with less than stoichiometric amounts of multifunctional polyols.

The castor oil component may be present in a quantity ranging from about 37% to about 65% by weight of the formulation. In a preferred embodiment, the castor oil component may be present in a quantity ranging from about 37% to about 56%. The castor oil component is a mixture of triglyceride compounds obtained from pressing castor seed. About 85 to about 95% of the side chains in the triglyceride compounds are ricinoleic acid and about 2 to 6% are oleic acid and about 1 to 5% are linoleic acid. Other side chains that are commonly present at levels of about 1% or less include linolenic acid, stearic acid, palmitic acid, and dihydroxystearic acid.

Intumescent Component

As described above, fire-resistant coatings according to embodiments of the disclosure also include an intumescent component. The intumescent component may comprise intumescent particles present in a quantity ranging from about 1% to about 40% by weight of the total formulation. In a preferred embodiment, the intumescent particles are present in a quantity ranging from about 10% to about 25% by weight of the formulation.

Intumescent particles suitable for use with embodiments of the disclosure include expandable graphite, which is graphite that has been loaded with an acidic expansion agent (generally referred to as an "intercalant") between the parallel planes of carbon that constitute the graphite structure. When the treated graphite is heated to a critical temperature the intercalant decomposes into gaseous products and causes the graphite to undergo substantial volumetric expansion. Manufacturers of expandable graphite include GrafTech International Holding Incorporated (Parma, Ohio). Specific expandable graphite products from GrafTech include those known as Grafguard® 160-50, Grafguard® 220-50 and Grafguard® 160-80. Other manufacturers of expandable graphite include HP Materials Solutions, Incorporated ((Woodland Hills, Calif.).). There are multiple manufacturers of expandable graphite in China and these products are distributed within North America by companies that include Asbury Carbons ((Sunbury, Pa.)) and the Global Minerals Corporation ((Bethseda, Md.).). Further, other types of intumescent particles known to a person of ordinary skill in the art would be suitable for use with embodiments of the disclosure.

Additive Components

In addition to the polyurethane matrix component and the intumescent component, fire-resistant coatings according to embodiments of the disclosure may include one or more additive components. Additives that may be incorporated into the fire retardant coating formulation to achieve beneficial effects include but are not limited to surfactants, wetting agents, opacifying agents, colorants, viscosifying agents, catalysts, preservatives, fillers, diluents, hydrated compounds, halogenated compounds, acids, bases, salts, borates, melamine and other additives that might promote the production, storage, processing, application, function, cost and/or appearance of this fire retardant coating for wood products.

One additive that may be particularly useful to incorporate into the formulation is micron-sized silica, including fumed silica and precipitated silica. Fumed silica is generally produced by pyrolysis of silicon tetrachloride or from quartz sand vaporized in a 3000° C. electric arc. It is commercially available from the Cabot Corporation (Boston, Mass.) under the trade name Cab-O-Sil. Precipitated silica is generally produced by addition of sulfuric acid to aqueous sodium silicate solutions. Precipitated silica is commercially available from Evonik Industries (Hanau-Wolfgang, Germany) under the trade-name Sipernat. The silica can be incorporated into the formulation at a level of 0 to 10% on a mass basis. The addition of micronized silica to the formulation may improve the toughness and durability of the coating after it has intumesced. Physical toughness may be beneficial because combustion events can involve fairly turbulent air currents. If a coating on a wood product intumesces during a fire and is too delicate in this expanded form, then it can be simply blown off of the wood product, which would compromise or eliminate its protective effect. In addition, in applications involving wood, silica may be effective to increase the bonding of the fire-resistant coating to the wood.

Preparation of Coating

The components described above may be combined using a number of different techniques. In some embodiments, intumescent particles are dispersed in castor oil along with other additives to form a relatively stable suspension, which can be shipped and stored for a period of time until it is ready to be used. Such a mixture can be referred to in this disclosure as the "polyol component." The isocyanate component (e.g., isocyanate or mixture of isocyanates) is generally stable and can be shipped and stored for prolonged periods of time as long as it is protected from water and other nucleophilic compounds. Such a mixture can be referred to in this disclosure as the "isocyanate component". Prior to application, these two components may be mixed together at a ratio that is generally about 15 to about 39% isocyanate component and 61 to about 85% polyol component, with the polyol component containing castor oil such that 37% to about 65% of the total formulation is castor oil. This particular formulating strategy results in a polyurethethane matrix with a suitable level of elasticity for use as a fire-resistant coating. Further, in some embodiments, other advantages may be realized. For example, the prepolymers of TDI or pMDI can have beneficial effects on the elasticity of the polymer matrix and they can alter the surface tension of uncured liquid components so that the intumescent particles tend to remain more uniformly suspended when the polyol and isocyanate components are combined just prior to application.

Prior to application of the coating to the substrate, mixing of the reactive components, especially the castor oil and the isocyanate compounds, should be performed. In one embodiment the intumescent particles can be suspended in castor oil along with the other formulation additives to make a stable liquid suspension, which can later be combined with the aromatic isocyanate compounds. Accordingly, the two liquid components can be combined at the proper ratio and mixed by use of meter-mixing equipment, such as that commercially available from The Willamette Valley Company (Eugene, Oreg.) or GRACO Incorporated (Minneapolis, Minn.). In some embodiments, three or more components (castor oil, intumescent, and aromatic isocyanates) can all be combined using powder/liquid mixing technology just prior to application. In some embodiments, the formulation has a limited "pot-life" and should be applied shortly after preparation. Thereafter, the formulation subsequently cures to form a protective coating that exhibits performance attributes as a fire-resistant coating for wood products.

In the absence of a catalyst the complete formulation may be applied to the wooden substrate in less than about 30 minutes after preparation. It is possible to increase the mixed pot-life by decreasing the temperature of the formulation mixture or by use of diluents. When catalysts are used in the formulation the mixed pot-life can be less than about 30 minutes. Examples of catalysts include organometallic compounds, such as dibutyltin dilaurate, stannous octoate, dibutyltin mercaptide, lead octoate, potassium acetate/octoate, and ferric acetylacetonate; and tertiary amine catalysts, such as N,N-dimethylethanolamine, N,N-dimethylcyclohexylamine, 1,4-diazobicyclo[2.2.2]octane, 1-(bis(3-dimethylaminopropyl)amino-2-propanol, and N,N-diethylpiperazine.

Application of Coating

Coatings according to embodiments of the disclosure may be applied to a number of different products. As a non-limiting example, such coatings may be applied to wood products. Generally, coatings according to embodiments of the disclosure are applied to one or more surfaces of a wood product at an application level of about 0.05 to about 3.0 g/in$^2$. In some embodiments, fire-resistant coatings may be applied to a portion of one or more surfaces of the wood product. In other embodiments, entire surfaces or the entire surface of wood product may be covered. In some embodiments, the fire-resistant coating covers approximately 50% to approximately 100% of the product's surface area.

FIG. 1-4 depict wood products having fire resistant coatings according to embodiments of the disclosure. FIGS. 1 and 2 show an I-joist 10 having a top flange 12, a bottom flange 14, and a webstock member 16 connecting the top flange 12 to the bottom flange 14. In FIG. 1, the webstock member 16 is shown completely coated in a fire-resistant coating 18 according to embodiments of the disclosure. In some embodiments, only a portion (e.g., 50% to 90%) of the webstock member 16 may be coated. Although not explicitly shown in FIG. 1, some portion of overspray may be applied to the top flange 12 and/or the bottom flange 14. Referring to FIG. 2, the I-joist 10 is shown completely covered in the fire-resistant coating 18. Alternatively, the top flange 12 and/or the bottom flange 14 may be coated with fire-resistant coatings according to embodiments of the disclosure. In some embodiments, the fire resistant coating may cover as little as 10% to 50% of the I-joist's surface area. In other embodiments, the fire resistant coating may cover 51% to 100% of the I-joist's surface area. A person of ordinary skill in the art will appreciate that numerous different application configurations for I-joists 10 not shown explicitly in FIGS. 1 and 2 are envisioned to be within the scope of this disclosure.

Referring to FIGS. 3 and 4, a wood element 20 is shown having a first surface 22, a second surface 24, a third surface 26, and a fourth surface 28 (fifth and sixth surfaces are not visible from this perspective). The wood element may be any type of wood product including but not limited to solid sawn lumber, parallel strand lumber (PSL), oriented strand board (OSB), oriented strand lumber, laminated veneer lumber (LVL), laminated strand lumber (LSL), particleboard, and medium density fiberboard (MDF). A person of ordinary skill in the art will appreciate that wood products according to this disclosure may have shapes other than those explicitly shown in the Figures. In FIG. 3, a single surface (e.g., the first surface 22) is shown coated in a fire-resistant coating 30 according to embodiments of the disclosure. The entire first surface 22 may be coated or a portion of the first surface 22 may be coated. In some situations, it may be cost effective to coat only a portion of a single surface of the wood element. For example, it is also possible that application of the coating to a wood element used as a building material could interfere with the ability of the wood element to be connected or fastened, such as by nailing or screwing, to other building materials. In this situation, complete coverage of all of the exposed surface area on the wood element might be undesirable. In FIG. 4, all four surfaces (e.g., the first surface 22, the second surface 24, the third surface 26, and the fourth surface 28) are shown coated with the fire-resistant coating 30. In some situations, it may be appropriate to cover each surface entirely or to cover only a portion of each surface. In some embodiments, the fire resistant coating may cover as little as 10% to 50% of the wood element's surface area. In other embodiments, the fire resistant coating may cover 51% to 100% of the wood element's surface area. A person of ordinary skill in the art will appreciate that numerous different application configurations for wood elements 20 not shown explicitly in FIGS. 3 and 4 are envisioned to be within the scope of this disclosure.

Further, coatings made according to embodiments of the disclosure may be applied to different types of wood products other than those explicitly shown. Such coatings may be applied to trusses or joists having any known configuration. In some embodiments, wood products coated according to the disclosure may include single sawn pieces of wood elements or products having specific shapes. As a non-limiting example, coatings according to the disclosure may be applied to a variety of wood products (e.g., trusses) having a top flange, bottom flange, and one or more web stock members.

The application level of the coating may generally be in the range of about 0.05 to about 3.0 g/in$^2$. The preferred coating application level may depend on the element to which the coating is applied, the intended use, and performance requirements. In some situations, minimal protection of the element might be needed and a relatively low spread rate may be suitable. For other situations (e.g., an exposed floor assembly) a higher application rate may be appropriate. Coatings according to embodiments of the disclosure may be applied with any equipment that would be suitable to a person of ordinary skill in the art such as spray systems, extruders, curtain coaters, and roll coaters, and other application equipment. In some situations, the coating might be applied manually with a hand-held knife or brush. In some embodiments, coatings according to embodiments of the disclosure may be applied to any surface area described herein as a series of discrete beads using an extruder or another equivalent apparatus. Such beads may each be approximately ⅛ of an inch to approximately 1 inch in diameter and may be spaced so that they are approximately ⅛ of an inch to approximately ¼ of an inch apart.

Although this disclosure explicitly describes applications of coatings to wood products, a person of ordinary skill in the art will appreciate that coatings made according to embodiments of the disclosure may be applied to different types of materials. As a non-limiting example, fire-resistant coatings may be applied to other types of construction materials including but not limited to wood/plastic composites, gypsum, steel (including light-gauge steel framing and steel beams and columns), aluminum (ducting), and concrete. Further, coatings according to embodiments of the disclosure may be applied to surfaces other than constructions materials in any situation where the coating's fire-resistant properties—or other properties—may be beneficial.

Words in the above disclosure using the singular or plural number may also include the plural or singular number, respectively. For example, the term "wood element" could also apply to "wood elements." Additionally, the words "herein," "above," "below" and words of similar import, when used in this application, shall refer to this application as a whole and not to any particular portions of this application. When the word "or" is used in reference to a list of two or more items, that word covers all of the following interpretations of the word: any of the items in the list, all of the items in the list, and any combination of the items in the list.

From the foregoing, it will be appreciated that the specific embodiments of the disclosure have been described herein for purposes of illustration, but that various modifications may be made without deviating from the disclosure. For example, formulations for fire-resistant coatings according to the disclosure may be impregnated in wood products or may be applied in a manner that is not considered a coating. In addition, coatings according to the disclosure may be used for reasons other than their fire-resistant properties.

Aspects of the disclosure described in the context of particular embodiments may be combined or eliminated in other embodiments. For example, aspects of the disclosure related to I-joists may be combined with aspects of the disclosure related to other wood products. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

EXAMPLES

Example 1

Water Durability of Conventional Coating

In a first example, the ability of a conventional fire-resistant coating to resist prolonged water exposure was evaluated. The conventional fire-resistant coating (FR116) tested was a phenol/formaldehyde resin containing about 13.3% expandable graphite by weight of the total formulation. The sample was prepared by charging a 600 mL glass beaker with water (170 g), 50% sodium hydroxide (aq) (7.5 g), kraft lignin powder (44 g), obtained from the Weyerhaeuser Company NR (Federal Way, Wash.), paraformaldehyde powder (2.5 g), a PF resin (88 g), known as 159C45 from the Georgia-Pacific Resins Corporation (Decatur, Ga.), fumed silica (3.0 g), known as Cab-O-Sil EH5 from the Cabot Corporation (Boston, Mass.), a wetting agent (0.5 g), known as Surfynol 104PA from Air Products & Chemicals, Incorporated (Allentown, Pa.), expandable graphite particles (50 g), known as Graf-Guard 160-50N from GrafTech International Holding Incorporated (Parma, Ohio), and the contents were stirred with a cowls mixer subsequent to each addition. A portion of this resin mixture (97.0 g) was combined with triacetin (3.0 g) and the mixture was vigorously stirred and applied to one major surface of a section of oriented strandboard (OSB) at an application rate of about 0.19 g/in2 (wet basis). The sample was then placed in a ventilated oven at a temperature of 80° C. for a period of 15 minutes, which was sufficient to dry and harden the coating. The sample was then turned over and the second major surface of the section of OSB was coated with the triacetin-spiked coating formulation at an application rate of about 0.19 g/in2 (wet basis). Again, the sample was transferred into a ventilated oven at a temperature of 80° C. for a period of 15 minutes, which was sufficient to dry and harden the coating. This sample was then allowed to equilibrate for a period of about two weeks prior to testing.

This sample was submerged under 1 inch of water in a tank at a temperature of 20° C. for a period of 24 hours. At the end of this process the sample was removed from the water and examined. It was estimated that about 70% of the coating had spontaneously been removed as a result of the water exposure. The coating that remained intact on the board was soft and swollen and could easily be removed by scraping. This example provides a demonstration of the inability of another fire retardant coating formulation (based on a PF resin) to resist prolonged exposure to water, such as that which could be experienced during a residential or commercial building process.

Example 2

Lab Scale OSB Fire Test of Conventional Coatings and Coatings According to Embodiments of the Disclosure In a second example, conventional fire-resistant coatings and a fire-resistant coating according to embodiments of the disclosure were evaluated to determine fire resistance performance in a lab scale test using a Bunsen burner and pieces of oriented strandboard. Control samples of oriented strandboard with no coating were also tested according to the procedure below. Table 1 below illustrates the main components of each coated sample in this experiment.

TABLE 1

Formulations for Example 2

| Sample | Resin | Castor Oil | Intumescent | Other |
|---|---|---|---|---|
| FR117 (Conventional) | 36.5% (PF resin) | None | 13.00% | 50.5%% |
| FR124 (Embodiment of Disclosure) | 15.0% (pMDI) | 35.0% | 40.0% | 10.0% |
| FR125 (Conventional) | 24.0% (pMDI) | 56.0% | None | 20.0% |
| FR123 (Embodiment of Disclosure) | 21.0% (pMDI) | 49.0% | 20.0% | 10.0% |
| FR121 (Embodiment of Disclosure) | 24.0% (pMDI) | 56.0% | 20.0% | 0.0% |
| FR198 (Embodiment of the Disclosure) | 28.6% (pMDI) | 50.1% | 17.0% | 4.3% |
| FR203 (Embodiment of the Disclosure) | 28.6% (pMDI) | 45.1% | 22.0% | 4.3% |

The following portion of the disclosure describes preparation of the coating for each of the samples:

Preparation of FR117: The first conventional fire-resistant coating (FR117) was a phenol/formaldehyde resin containing about 13.0% expandable graphite by weight of the total formulation. The sample was prepared by charging a 600 mL glass beaker with a PF resin (280 g), known as 159C45 from the Georgia-Pacific Resins Corporation (Decatur, Ga.), fumed silica (3.0 g), known as Cab-O-Sil EH5 from the Cabot Corporation (Boston, Mass.), a wetting agent (0.5 g), known as Surfynol 104PA from Air Products & Chemicals, Incorporated (Allentown, Pa.), expandable graphite particles (50 g), known as GrafGuard 160-50N from GrafTech International Holding Incorporated (Parma, Ohio), and alumina trihydrate (50 g), known as Micral 932 from the J.M. Huber Corporation (Atlanta, Ga.), and the contents were stirred with a cowls mixer subsequent to each addition.

Preparation of FR124: A fire-resistant coating (FR124) made according to embodiments of the disclosure contained the following components by weight of the total formulation: 15.0% aromatic isocyanate, 35.0% castor oil, 40.0% expandable graphite, and 10.0% additives. The sample was prepared by charging a 400 mL glass beaker with castor oil (52.5 g), melamine phosphate powder (15.0 g) supplied by PUR Polymerics Incorporated ((Cambridge, ON),) expandable graphite particles (60 g), known as GrafGuard 220-50N from GrafTech International Holding Incorporated (Parma, Ohio), and pMDI (22.5), known as Rubinate 1840 from Huntsman Polyurethanes (The Woodlands, Tex.) and the contents were stirred with a cowls mixer subsequent to each addition.

Preparation of FR125: The third conventional fire-resistant coating (FR125) contained the following components by weight of the total formulation: 24.0% aromatic isocynante and 56.0% castor oil. In this sample, the expandable graphite was replaced with a conventional blowing agent. The sample was prepared by charging a 400 mL glass beaker with castor oil (84.0 g), 4-toluenesulfonic acid hydrazide (30.0 g) known as Celogen TSH from the Chemtura Corporation (Philadelphia, Pa.), and pMDI (36.0 g), known as Rubinate 1840 from Huntsman Polyurethanes (The Woodlands, Tex.) and the contents were stirred with a cowls mixer subsequent to each addition.

Preparation of FR123: A fire-resistant coating (FR123) made according to embodiments of the disclosure contained the following components by weight of the total formulation: 21.0% aromatic isocynante, 49.0% castor oil, 20.0% expandable graphite, and 10.0% additives. A sample was prepared by charging a 400 mL glass beaker with castor oil (73.5 g), melamine phosphate powder (15.0 g) supplied by PUR Polymerics Incorporated [Cambridge, ON], expandable graphite particles (30 g), known as GrafGuard 220-50N from GrafTech International Holding Incorporated (Parma, Ohio), and pMDI (31.5), known as Rubinate 1840 from Huntsman Polyurethanes (The Woodlands, Tex.) and the contents were stirred with a cowls mixer subsequent to each addition.

Preparation of FR121: A fire-resistant coating (FR121) made according to embodiments of the disclosure contained the following components by weight of the total formulation: 24.0% aromatic isocynante, 56.0% castor oil, and 20.0% expandable graphite. A sample was prepared by charging a 400 mL glass beaker with castor oil (84.0 g), expandable graphite particles (30 g), known as GrafGuard 220-50N from GrafTech International Holding Incorporated (Parma, Ohio), and pMDI (36.0), known as Rubinate 1840 from Huntsman Polyurethanes (The Woodlands, Tex.) and the contents were stirred with a cowls mixer subsequent to each addition.

Preparation of FR198: A fire-resistant coating (FR198) made according to embodiments of the disclosure contained the following components by weight of the total formulation: 29.0% aromatic isocynante, 50.0% castor oil, 3% fumed silica, and 17.0% expandable graphite. A sample was prepared by charging a 400 mL glass beaker with castor oil (100.2 g), a surfactant (0.3 g) known as Niax Silicone L6900 from Momentive Performance Materials, titanium dioxide powder (2.3 g), fumed silica (6.0 g) known as Cab-O-Sil EH-5 from the Cabot Corporation, expandable graphite particles (34 g), known as GrafGuard 160-50N from GrafTech International Holding Incorporated (Parma, Ohio), an isocyanate prepolymer (18.9 g) known as Rubinate 9511 from Huntsman Polyurethanes, and pMDI (38.3 g), known as Rubinate 1840 from Huntsman Polyurethanes (The Woodlands, Tex.) and the contents were stirred with a cowls mixer subsequent to each addition.

Preparation of FR203: A fire-resistant coating (FR203) made according to embodiments of the disclosure contained the following components by weight of the total formulation: 29.0% aromatic isocynante, 45.0% castor oil, 3.0% fumed silica, and 22.0% expandable graphite A sample was prepared by charging a 400 mL glass beaker with castor oil (90.2 g), a surfactant (0.3 g) known as Niax Silicone L6900 from Momentive Performance Materials, titanium dioxide powder (2.3 g), fumed silica (6.0 g) known as Cab-O-Sil EH-5 from the Cabot Corporation, expandable graphite particles (44 g), known as GrafGuard 160-50N from GrafTech International Holding Incorporated (Parma, Ohio), an isocyanate prepolymer (18.9 g) known as Rubinate 9511 from Huntsman Polyurethanes, and pMDI (38.3 g), known as Rubinate 1840 from Huntsman Polyurethanes (The Woodlands, Tex.) and the contents were stirred with a cowls mixer subsequent to each addition.

Application of Coating: Sections of oriented strand board (⅜ inches thick×8 inches wide×8 inches long) from Weyerhaeuser Company (Federal Way, Wash.) were provided. For the FR117 sample, a portion of the mixture from FR117 (97.0 g) was combined with triacetin (3.0 g) and the mixture was vigorously stirred and applied to one major surface of a section of the OSB at an application rate of about 0.38 g/in2 (wet basis). The FR117 sample was then placed in a ventilated oven at a temperature of 80° C. for a period of 15 minutes, which was sufficient to dry and harden the coating. The FR117 sample was then turned over and the second major surface of the section of OSB was coated with the triacetin-spiked coating formulation at an application rate of about 0.38 g/in2 (wet basis). Again, the FR117 sample was transferred into a ventilated oven at a temperature of 80° C. for a period of 15 minutes, which was sufficient to dry and harden the coating. The FR117 sample was then allowed to equilibrate for a period of about two weeks prior to testing. For the FR121, FR123, FR124, FR125, FR198, and FR203 samples, the coating was applied to one major surface of a section of the oriented strandboard at an application rate of about 0.56 g/in2. Each sample was allowed to cure at a temperature of 20° C. for a period of 6 hours prior to handling. Each sample was then allowed to equilibrate for a period of about one week prior to testing.

Fire Testing: All of the samples were suspended about a distance (ranging from about 3 inches to about 6 inches) over a Bunsen burner and supported along two opposing edges with bricks. In this manner one coated, major face of each was directly exposed to the top of a flame from the burner for a period of 15 minutes. At the end of the exposure period, the FR121, FR123, FR124, FR198, and FR203 samples were removed and submerged in a pail of water in order to quickly cool the material. A chisel was used to scrape the char off of the sample especially in the center location which was directly above the flame. The residual thickness of wood that was left in the center location was then measured with a caliper. Each sample was observed during the exposure period and the results are described below. Table 2 summarizes the results. "Ignition time" indicates when the sample was fully engulfed in flame. "Burn time" indicates the amount of time that the burner flame was applied to the sample. FIG. 5 is an exemplary graph of temperature vs. time comparing one of the control samples (Control 1) to a sample made according to embodiments of the disclosure (FR123).

a hole that extended completely through the center of the sample. These results demonstrate the inability of a polymer-matrix-based conventional coating to contain the intumescent particles when a coating based on the PF resin and intumescent particles is exposed to fire.

Observations about FR124: The coating expanded to a thickness of about 1.75 inches within about 2 minutes of exposure and some of the intumescent fell off of the OSB substrate. The residual thickness of wood that was left in the center location was measured with a caliper and it was determined that only 51% of the thickness of the wood had been preserved.

Observations about FR125: The sample burst into flames after only 29 seconds of exposure to the flame.

Observations about FR123: The coating expanded to a thickness of about 1.5 inches within about 2 minutes of exposure and most of the intumescent remained attached to the OSB substrate. The residual thickness of wood that was left in the center location was measured with a caliper and it was determined that 90% of the thickness of the wood had been preserved.

Observations about FR121: The coating expanded to a thickness of about 1.25 inches within about 2 minutes of exposure and most of the intumesced coating remained attached to the OSB substrate. The residual thickness of wood that was left in the center location was measured with a caliper and it was determined that about 79% of the thickness of the wood had been preserved.

Observations about FR198: The coating expanded to a thickness of about 1.375 inches within about 2 minutes of exposure with all of the intumesced coating remained attached to the OSB substrate. The residual thickness of wood that was left in the center location was measured with a caliper and it was determined that about 50% of the thickness of the wood had been preserved.

Observations about FR203: The coating expanded to a thickness of about 1.125 inches within about 2 minutes of

TABLE 2

Results for Example 2

| Sample | OSB Thickness | Burner Intensity | Ignition Time (min) | Burn Time (min) | Remaining OSB |
|---|---|---|---|---|---|
| Uncoated Control 1 (Conventional) | 7/16 inches | Medium | 00:42 | 5:00 | 52.0% |
| FR117 (Conventional) | 7/16 inches | Medium | NA | 15:00 | 0.0% |
| FR124 (Embodiments of Disclosure) | 7/16 inches | Medium | None | 15:00 | 51.0% |
| FR125 (Conventional) | 7/16 inches | Medium | 00:29 | 00:29 | Not applicable |
| FR123 (Embodiments of Disclosure) | 7/16 inches | Medium | None | 15:00 | 90.0% |
| FR121 (Embodiments of Disclosure) | 7/16 inches | Medium | None | 15:00 | 79.0% |
| Uncoated Control 2 (Conventional) | 3/8 inches | High | 00:25 | 3:28 | 50.0% |
| FR198 (Embodiments of the Disclosure) | 3/8 inches | High | None | 15:41 | 50.0% |
| FR203 (Embodiments of the Disclosure) | 7/16 inches | High | None | 16:48 | 50.0% |

Observations about FR117: After about one minute of exposure the intumescent particles in the conventional coating began to expand, but as they expanded they simply broke away from the coating matrix and fell away from the wood. By the end of the 15-minute exposure period fire had created exposure with all of the intumesced coating remained attached to the OSB substrate. The residual thickness of wood that was left in the center location was measured with a caliper and it was determined that about 50% of the thickness of the wood had been preserved.

Example 3

Lab Scale LVL Fire Test of Conventional Coatings and Coatings According to Embodiments of the Disclosure In a third example, conventional fire-resistant coatings and a fire-resistant coating according to embodiments of the disclosure were evaluated to determine fire resistance performance in a lab scale fire test involving a block of laminated veneer lumber and a Bunsen burner. Two control samples of laminated veneer lumber with no coating were also tested according to the procedures described below. Table 3 below illustrates the main components of each coated sample in this experiment.

TABLE 3

Formulations for Example 3

| Sample | Isocyanate | Castor Oil | Intumescent | Other |
|---|---|---|---|---|
| FR152 (Embodiment of Disclosure) | 22.7% | 37.5% | 5.1% | 34.7% |
| FR135 (Embodiment of Disclosure) | 24.8% | 43.4% | 7.8% | 24.0% |
| FR142 (Embodiment of Disclosure) | 22.3% | 38.5% | 7.8% | 31.4% |
| FR146 (Embodiment of Disclosure) | 25.8% | 44.6% | 5.5% | 24.1% |

Preparation of FR 152: A fire-resistant coating (FR152) made according to embodiments of the disclosure contained the following components by weight of the total formulation: 22.7% aromatic isocynante, 37.5% castor oil, 5.1% expandable graphite, and 34.7% other components. A sample was prepared by charging a 400 mL glass beaker with castor oil (63.0 g), silicone surfactant (0.3 g), known as Niax L6900 from Momentive Performance Materials (Danbury, Conn.), titanium dioxide powder (2.0 g), dibutyltin dilaurate (50 mg), precipitated silica (6.0 g), known as Sipernat 50S from Evonic Industries (Hanau-Wolfgang, Germany), expandable graphite particles (8.5 g), known as GrafGuard 160-50N from GrafTech International Holding Incorporated (Parma, Ohio), sodium tetraborate decahydrate powder (50.0 g), a pMDI prepolymer (19.0 g) known as Rubinate 9511 from Huntsman Polyurethanes (The Woodlands, Tex.), and pMDI (19.0 g), known as Rubinate 1840 from Huntsman Polyurethanes (The Woodlands, Tex.) and the contents were stirred with a cowls mixer subsequent to each addition.

Preparation of FR135: A fire-resistant coating (FR135) made according to embodiments of the disclosure contained the following components by weight of the total formulation: 24.8% aromatic isocynante, 43.4% castor oil, 7.8% expandable graphite, and 24.0% other components. A sample was prepared by charging a 400 mL glass beaker with castor oil (70.0 g), silicone surfactant (0.3 g), known as Niax L6900 from Momentive Performance Materials (Danbury, Conn.), titanium dioxide powder (2.0 g), expandable graphite particles (12.5 g), known as GrafGuard 160-50N from GrafTech International Holding Incorporated (Parma, Ohio), anhydrous magnesium sulfate powder (36.5 g), a pMDI prepolymer (20.0 g) known as Rubinate 9511 from Huntsman Polyurethanes (The Woodlands, Tex.), and pMDI (20.0 g), known as Rubinate 1840 from Huntsman Polyurethanes (The Woodlands, Tex.) and the contents were stirred with a cowls mixer subsequent to each addition.

Preparation of FR142: A fire-resistant coating (FR142) made according to embodiments of the disclosure contained the following components by weight of the total formulation: 22.3% aromatic isocynante, 38.5% castor oil, 7.8% expandable graphite, and 31.4% other components. A sample was prepared by charging a 400 mL glass beaker with castor oil (62.1 g), silicone surfactant (0.3 g), known as Niax L6900 from Momentive Performance Materials (Danbury, Conn.), titanium dioxide powder (2.0 g), expandable graphite particles (12.5 g), known as GrafGuard 160-50N from GrafTech International Holding Incorporated (Parma, Ohio), anhydrous magnesium sulfate powder (48.4 g), a pMDI prepolymer (18.0 g) known as Rubinate 9511 from Huntsman Polyurethanes (The Woodlands, Tex.), and pMDI (18.0 g), known as Rubinate 1840 from Huntsman Polyurethanes (The Woodlands, Tex.) and the contents were stirred with a cowls mixer subsequent to each addition.

Preparation of FR146: A fire-resistant coating (FR146) made according to embodiments of the disclosure contained the following components by weight of the total formulation: 25.8% aromatic isocynante, 44.6% castor oil, 5.5% expandable graphite, and 24.1% other components. A sample was prepared by charging a 400 mL glass beaker with castor oil (72.0 g), silicone surfactant (0.3 g), known as Niax L6900 from Momentive Performance Materials (Danbury, Conn.), titanium dioxide powder (2.0 g), expandable graphite particles (8.9 g), known as GrafGuard 160-50N from GrafTech International Holding Incorporated (Parma, Ohio), anhydrous sodium tetraborate powder (36.5 g), a pMDI prepolymer (20.8 g) known as Rubinate 9511 from Huntsman Polyurethanes (The Woodlands, Tex.), and pMDI (20.8 g), known as Rubinate 1840 from Huntsman Polyurethanes (The Woodlands, Tex.) and the contents were stirred with a cowls mixer subsequent to each addition.

Application of Coating: Blocks of Douglas fir laminated veneer lumber (LVL) (1.375 inches thick×2.25 inches wide×8.0 inches long) from the Weyerhaeuser Company (Federal Way, Wash.) were provided. Each block was coated on one major face surface and two edges with one of the mixtures described above. Each mixture was applied to the LVL within 15 to 25 minutes of preparation. Each sample was allowed to cure at a temperature of 20° C. for a period of 6 hours prior to handling. Each sample was then allowed to equilibrate for a period of about one week prior to testing.

Figure 6:
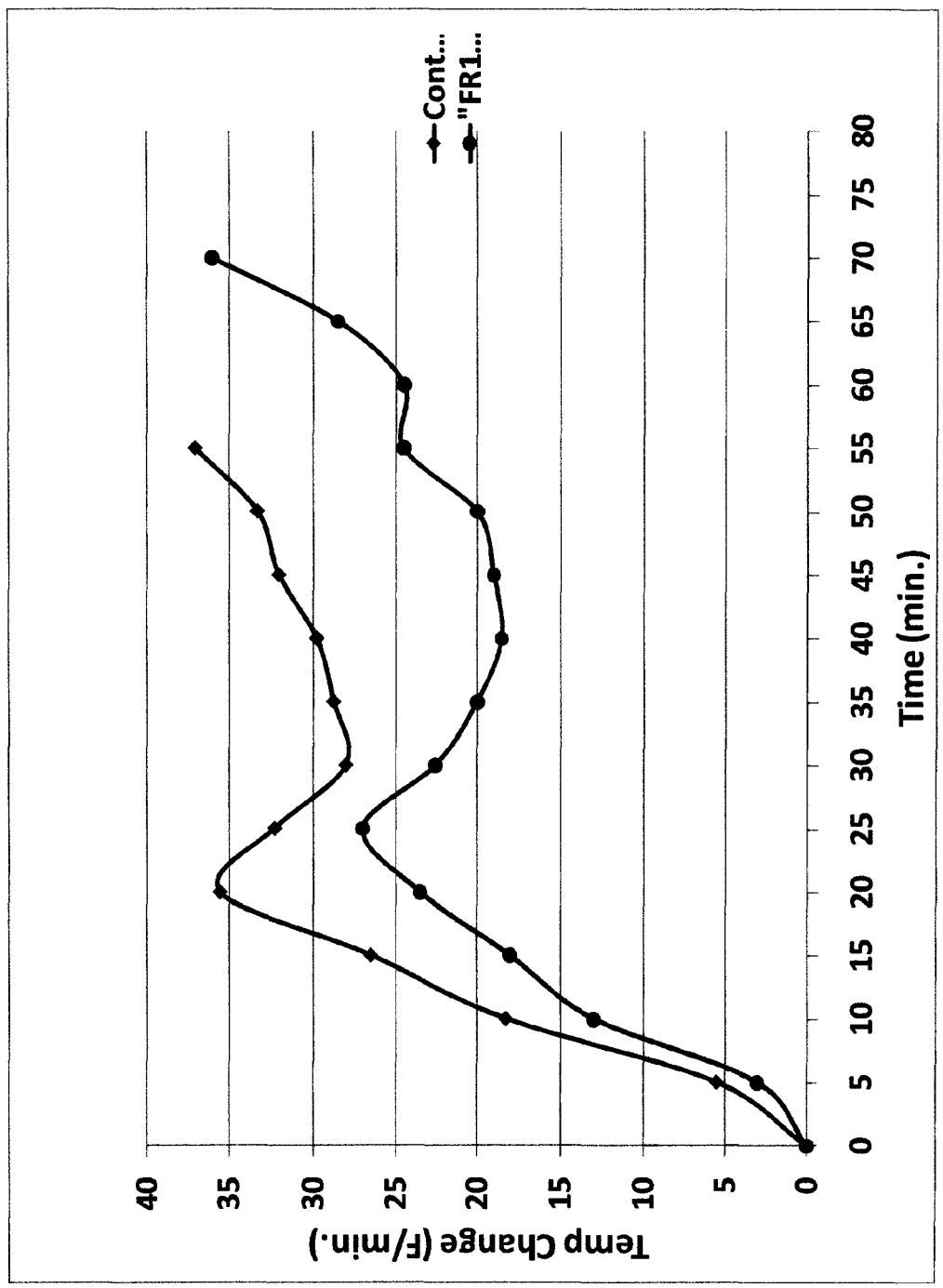
FIG. 6 is a graph of temperature change versus time for lab scale fire tests.
Figure 7:
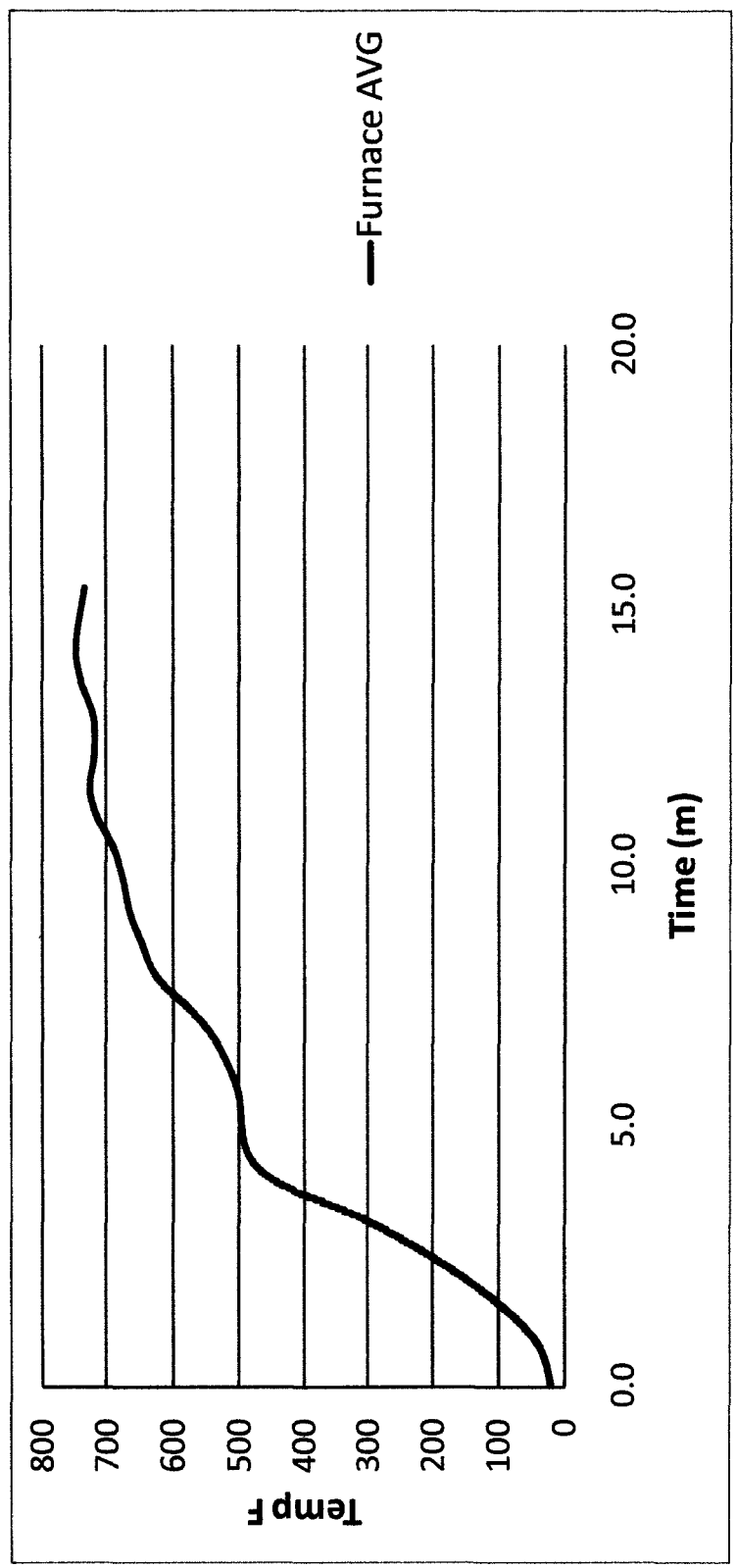
FIG. 7 is a graph of temperature versus time for an ASTM E119 fire test.

Fire Testing: A hole was drilled into the center of the "untreated" major face of each block and extended 0.875 inch deep into the LVL. A plastic-coated thermocouple was inserted into each hole with the tip of the thermocouple fully inserted into the bottom of each hole. Each specimen was mounted in a fume hood such that the major face with the hole and the thermocouple were facing directly upward. Glass wool insulation was applied to the top and sides of each block of perforated LVL. The bottom major face of the LVL was the coated face. A section of gypsum (½ inches thick×8 inches×8 inches) was mounted in a horizontal orientation below each block of LVL such that a ½ inch gap between the top of the gypsum and the bottom of the LVL existed. A Bunsen burner with regulated gas flow rate was positioned below the gypsum section such that the top of the flame was in contact with the bottom of the gypsum. Initial temperatures and the time to reach a temperature of 400° F. were then measured for each sample. Table 3 summarizes the results and FIG. 6 is a graph of temperature vs. time comparing the first control sample to the sample made according to embodiments of the disclosure (FR152).

TABLE 4

Results from Example 3

| Sample | Initial Temperature (degrees F.) | Time to Reach 400° F. (minutes) |
|---|---|---|
| First Control (Conventional Uncoated) | 72 | 56.5 |
| Second Control (Conventional Uncoated) | 72 | 57.2 |
| FR152 (Embodiment of Disclosure) | 71 | 73.7 |
| FR135 (Embodiment of Disclosure) | 70 | 70.0 |
| FR142 (Embodiment of Disclosure) | 72 | 69.1 |
| FR146 (Embodiment of Disclosure) | 71 | 66.0 |

Example 4

I-Joist Fire Test of Coatings According to Embodiments of the Disclosure

In a fourth example, fire-resistant coatings according to embodiments of the disclosure were evaluated to determine ability to carry a structural load for an extended period of time when exposed to fire and an elevated temperature. Sections of I-joists treated with coatings according to embodiments of the disclosure were tested according to the procedures described in ASTM E119 (Standard Test Methods for Fire Tests of Building Construction and Materials), the contents of which are hereby incorporated by reference. Table 4 below illustrates the main components of each sample in this experiment.

TABLE 5

Formulations for Example 4

| Sample | Iso-cyanate | Castor Oil | Intumescent | Other |
|---|---|---|---|---|
| FR175 (Embodiment of Disclosure) | 28.6% | 40.1% | 27.0% | 4.3% |
| FR128 (Embodiment of Disclosure) | 28.6% | 40.1% | 30.1% | 1.2% |

Preparation of FR175: A fire-resistant coating (FR175) made according to embodiments of the disclosure contained the following components by weight of the total formulation: 28.6% aromatic isocynante, 40.1% castor oil, 27.0% expandable graphite, and 4.3% other components. The FR175 sample comprised part 'A' and part 'B.' Part 'A' was prepared by charging a 5-gallon mixing vessel with castor oil (4,908.6 g), titanium dioxide dispersion (309.6 g), expandable graphite particles (3,403.8 g), known as GrafGuard 160-50N from GrafTech International Holding Incorporated (Parma, Ohio), and precipitated silica (378.0 g), known as Sipernat 50S from Evonic Industries (Hanau-Wolfgang, Germany). This mixture was stirred for ten minutes after each addition by use of a double-helical mixer at low speed. The titanium dioxide dispersion was made by charging a 1-Liter plastic beaker with castor oil (400.0 g), silicone surfactant (60.0 g), known as Niax L6900 from Momentive Performance Materials (Danbury, Conn.), and titanium dioxide powder (400.0 g) and stirring this mixture under high shear with a cowls mixer for a period of 10 minutes. Part 'B' of the FR175 formulation was made by charging a 5-gallon mixing vessel with a pMDI prepolymer (1,400.0 g) known as Rubinate 9511 from Huntsman Polyurethanes (The Woodlands, Tex.), and pMDI (2,100 g), known as Rubinate 1840 from Huntsman Polyurethanes (The Woodlands, Tex.) and stirring the mixture manually with a metal spatula for a period of 2 minutes. The FR175 formulation was prepared by combining part 'A' (125 g) with part 'B' (50 g) in a disposable container. The contents of the cup were then mixed manually for about 30 seconds before application.

Preparation of FR128: A fire-resistant coating (FR128) made according to embodiments of the disclosure contained the following components by weight of the total formulation: 28.6% aromatic isocynante, 40.1% castor oil, 30.1% expandable graphite, and 1.2% other components. The FR128 sample comprised part 'A' and part 'B.' Part 'A' was prepared by charging a 5-gallon mixing vessel with castor oil (10,880 g), titanium dioxide dispersion (688.0 g), and expandable graphite particles (8,400 g), known as GrafGuard 160-50N from GrafTech International Holding Incorporated (Parma, Ohio). This mixture was stirred for ten minutes after each addition by use of a double-helical mixer at low speed. The titanium dioxide dispersion was made by charging a 1-Liter plastic beaker with castor oil (400.0 g), silicone surfactant (60.0 g), known as Niax L6900 from Momentive Performance Materials (Danbury, Conn.), and titanium dioxide powder (400.0 g) and stirring this mixture under high shear with a cowls mixer for a period of 10 minutes. Part 'B' of the FR128 formulation was made by charging a 5-gallon mixing vessel with a pMDI prepolymer (4,800 g) known as Rubinate 9511 from Huntsman Polyurethanes (The Woodlands, Tex.), and pMDI (3,200 g), known as Rubinate 1840 from Huntsman Polyurethanes (The Woodlands, Tex.) and stirring the mixture manually with a metal spatula for a period of 2 minutes. The FR128 formulation was prepared by combining part 'A' (125 g) with part 'B' (50 g) in a disposable container. The contents of the cup were then mixed manually for about 30 seconds before application.

Application of Coating: Sections of iLevel TJI 210 wooden I-joist (14 feet long) were obtained from the Weyerhaeuser Company NR (Federal Way, Wash.) for this experiment. This I-joist product (9.5 inch deep) is made with an OSB web (3/8 inch thick) and a laminated veneer (LVL) flange (2.08 inch wide×1.375 inch deep). With the exception of the top major face of the top flange, all exposed surfaces of these I-joists were coated. FR128 was applied at an application level of about 0.56 g/in$^2$. FR175 was applied at an application level of about 1.11 g/in$^2$. The coatings were applied to the I-joist in a manual fashion and were allowed to cure at a temperature of 20° C. for a period of about one week prior to testing. Neither the top or bottom flanges were coated.

Procedures: Two to four sections of treated I-joists were built into a fully-exposed floor assembly as prescribed in ASTM E119. Each assembly was loaded to 50% of its moment capacity and exposed to fire and elevated temperature under the conditions prescribed in ASTM E119. Each sample was then observed to determine the length of time it could sustain the structural load before catastrophic failure. Generally, conventional uncoated wooden I-joists subjected to these same test conditions will typically fail in about 4 minutes. Each of the samples in this experiment was able to sustain the structural load for a period of time that exceeded 13 minutes. Table 6 summarizes the results.

TABLE 6

Results from Example 4

| Sample | Time Before Failure (min: seconds) |
|---|---|
| FR175 (Embodiment of Disclosure) | 15:42 |
| FR128 (Embodiment of Disclosure) | 12:42 |

We claim:

1. A fire-resistant coating for a wood product, the fire-resistant coating being a formulation comprising:
  a polyurethane matrix comprising:
    an aromatic isocyanate, the aromatic isocyanate being present in a quantity ranging from 24% to 39% by weight of the formulation; and
    castor oil, the castor oil being present in a quantity ranging from 37% to 65% by weight of the formulation; and
  intumescent particles embedded in the polyurethane matrix.

2. The fire-resistant coating of claim 1 wherein the intumescent particles are present in a quantity ranging from 1% to 40% by weight of the formulation.

3. The fire-resistant coating of claim 2 wherein the castor oil is present is a quantity ranging from 43% to 56% by weight of the total formulation.

4. The fire-resistant coating of claim 3 wherein the intumescent particles are present in a quantity ranging from 12% to 25% by weight of the formulation.

5. The fire-resistant coating of claim 1 wherein the aromatic isocyanate is selected from the group consisting of: toluene diisocyanate (TDI), monomeric methylene diphenyldiisocyanate (MDI), polymeric methylenediphenyldiisocyanate (pMDI), 1,5'-naphthalenediisocyante, prepolymers of TDI, and prepolymers of pMDI.

6. The fire-resistant coating of claim 1, further comprising fumed silica present in a quantity ranging from 1% to 10% by weight of the formulation.

7. The fire-resistant coating of claim 1 wherein the intumescent particles are expandable graphite.

8. The fire-resistant coating of claim 1, further comprising one or more additives, the one or more additives selected from the group consisting of: silica, surfactants, wetting agents, opacifying agents, colorants, viscosifying agents, catalysts, preservatives, fillers, diluents, hydrated compounds, halogenated compounds, acids, bases, salts, borates, and melamine.

9. A fire-resistant wood product comprising:
  a wood element having one or more surfaces;
  a fire-resistant coating disposed on at least a portion of the one or more surfaces, the fire resistant coating comprising:
    an aromatic isocyanate present in a quantity ranging from 24% to 39% by weight of the coating; and
    castor oil present in a quantity ranging from 37% to 65% by weight of the coating; and
    intumescent particles present in a quantity ranging from 1% to 40% by weight of the coating.

10. The fire-resistant wood product of claim 9 wherein the fire-resistant coating is present in a quantity ranging from 0.05 grams per square inch to 3.0 grams per square inch.

11. The fire-resistant wood product of claim 9 the aromatic isocyanate is selected from the group consisting of: toluene diisocyanate (TDI), monomeric methylene diphenyldiisocyanate (MDI), polymeric methylenediphenyldiisocyanate (pMDI), 1,5'-naphthalenediisocyante, prepolymers of TDI, and prepolymers of pMDI.

12. The fire-resistant wood product of claim 9 wherein the intumescent particles are expandable graphite.

13. The fire-resistant wood product of claim 9 wherein the fire-resistant coating covers 100% of each of the one or more surfaces.

14. The fire-resistant wood product of claim 9 wherein the wood element is selected from the group consisting of: wood composites and solid sawn lumber.

15. A fire-resistant wood product comprising:
  a top flange;
  a bottom flange; and
  one or more webstock members connecting the top flange to the bottom flange;
  wherein at least a portion of the I-joist is coated in a fire-resistant coating, the fire resistant coating comprising:
    an aromatic isocyanate present in a quantity ranging from 24% to 39% by weight of the coating; and
    castor oil present in a quantity ranging from 37% to 65% by weight of the coating; and
    intumescent particles present in a quantity ranging from 1% to 40% by weight of the coating.

16. The fire-resistant wood product of claim 15 wherein the fire-resistant coating is present in a quantity ranging from 0.05 grams per square inch to 3.0 grams per square inch.

17. The fire-resistant wood product of claim 15 wherein at least a portion of the webstock member is coated in the fire-resistant coating.

18. The fire-resistant wood product of claim 15 wherein at least a portion of the top flange is coated in the fire-resistant coating.

19. The fire-resistant wood product of claim 15 wherein at least a portion of the bottom flange is coated in the fire-resistant coating.

20. The fire-resistant wood product of claim 15 wherein 50% to 100% of the wood product's surface is coated in the fire-resistant coating.

21. The fire-resistant wood product of claim 15 wherein the wood product is selected from the group consisting of: I-joists, trusses, solid sawn lumber, parallel strand lumber (PSL), oriented strand board (OSB), oriented strand lumber (OSL), laminated veneer lumber (LVL), laminated strand lumber (LSL), particleboard, and medium density fiberboard (MDF).

* * * * *